US010089857B2

(12) United States Patent
Atchley et al.

(10) Patent No.: US 10,089,857 B2
(45) Date of Patent: Oct. 2, 2018

(54) APPARATUS AND METHOD FOR PROVIDING AUDIO DELIVERY NOTIFICATION WITH A DOORBELL

(71) Applicant: Wal-Mart Stores, Inc., Bentonville, AR (US)

(72) Inventors: Michael D. Atchley, Springdale, AR (US); John P. Thompson, Bentonville, AR (US); Robert C. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/480,916

(22) Filed: Apr. 6, 2017

(65) Prior Publication Data

US 2017/0294110 A1    Oct. 12, 2017

Related U.S. Application Data

(60) Provisional application No. 62/319,479, filed on Apr. 7, 2016.

(51) Int. Cl.
| | |
|---|---|
| G08B 25/12 | (2006.01) |
| G08B 3/10 | (2006.01) |
| H04L 29/08 | (2006.01) |

(52) U.S. Cl.
CPC ............ *G08B 25/12* (2013.01); *G08B 3/10* (2013.01); *H04L 67/12* (2013.01)

(58) Field of Classification Search
CPC ............ G08B 25/12; G08B 3/10; H04L 67/12
See application file for complete search history.

(56) References Cited

U.S. PATENT DOCUMENTS

| | | | |
|---|---|---|---|
| 752,722 A | 2/1904 | Stromberg | |
| 7,135,959 B2 * | 11/2006 | Wagner | G08B 3/10 340/286.11 |
| 7,650,295 B2 | 1/2010 | Matsumoto | |
| 8,953,040 B1 * | 2/2015 | Scalisi | H04N 7/186 348/143 |
| 9,160,987 B1 * | 10/2015 | Kasmir | H04N 7/186 |
| 9,179,107 B1 * | 11/2015 | Scalisi | G08B 7/064 |

(Continued)

OTHER PUBLICATIONS

Fairs, Marcus; "Domino's launches world's first driverless pizza delivery vehicles", Dezeen, https://www.dezeen.com/2015/04/01/dominos-launches-worlds-first-driverless-pizza-delivery-vehicles/, Apr. 1, 2015, pp. 1-10.

(Continued)

*Primary Examiner* — Brian Miller
(74) *Attorney, Agent, or Firm* — Fitch, Even, Tabin & Flannery LLP

(57) ABSTRACT

Systems, apparatuses, and methods are provided herein for providing audio notification. A system for providing audio notification comprises a communication device configured to communicate with a delivery arrival detection system, a doorbell coupler configured to couple to a stationary doorbell device, and a control circuit coupled to the communication device and the doorbell coupler. The control circuit being configured to receive a delivery notification from the delivery arrival detection system via the communication device and cause the stationary doorbell device to produce an audible sound via the doorbell coupler.

21 Claims, 7 Drawing Sheets

(56) References Cited

U.S. PATENT DOCUMENTS

| | | | |
|---|---|---|---|
| 9,571,661 B2* | 2/2017 | Marsh | H04M 11/025 |
| 9,619,676 B2* | 4/2017 | Valentine | G06K 7/01 |
| 9,626,841 B2* | 4/2017 | Fadell | G08B 19/005 |
| 9,894,471 B1* | 2/2018 | Zalewski | H04W 4/008 |
| 2002/0054370 A1 | 5/2002 | Hara | |
| 2004/0229569 A1* | 11/2004 | Franz | H04M 3/16 |
| | | | 455/66.1 |
| 2005/0135584 A1* | 6/2005 | Thomas | H04M 3/533 |
| | | | 379/167.01 |
| 2007/0118488 A1 | 5/2007 | Bozzomo | |
| 2011/0074570 A1* | 3/2011 | Feldstein | H04L 12/2825 |
| | | | 340/539.11 |
| 2013/0103606 A1 | 4/2013 | Holliday | |
| 2015/0120015 A1* | 4/2015 | Fadell | G08B 19/005 |
| | | | 700/90 |
| 2015/0120529 A1* | 4/2015 | Faaborg | G06Q 10/083 |
| | | | 705/39 |
| 2015/0120596 A1* | 4/2015 | Fadell | G08B 27/003 |
| | | | 705/330 |
| 2015/0127712 A1* | 5/2015 | Fadell | G06Q 10/083 |
| | | | 709/202 |
| 2015/0142692 A1* | 5/2015 | Gillen | G06Q 10/083 |
| | | | 705/330 |
| 2015/0145643 A1* | 5/2015 | Fadell | G06Q 10/083 |
| | | | 340/5.51 |
| 2015/0148988 A1* | 5/2015 | Fleck | G05D 1/0011 |
| | | | 701/2 |
| 2015/0156031 A1* | 6/2015 | Fadell | H04L 12/2816 |
| | | | 700/276 |
| 2015/0228419 A1 | 8/2015 | Fadell | |
| 2015/0310381 A1* | 10/2015 | Lyman | G06Q 10/083 |
| | | | 705/330 |
| 2017/0193442 A1* | 7/2017 | Ekkel | G06Q 10/0832 |
| 2017/0293301 A1* | 10/2017 | Myslinski | G05D 1/0088 |
| 2017/0323545 A1* | 11/2017 | Gillen | G08B 13/24 |
| 2017/0337791 A1* | 11/2017 | Gordon-Carroll | |
| | | | G08B 13/19645 |

OTHER PUBLICATIONS

Schiller, Ben; "No More Waiting for the FedEx Guy, This Handy Robot Delivers At Your Leisure", Fast Company, https://www.fastcompany.com/3053844/no-more-waiting-for-the-fedex-guy-this-handy-robot-delivers-at-your-leisure, Dec. 4, 2015, pp. 1-4.

* cited by examiner

APPARATUS AND METHOD FOR PROVIDING AUDIO DELIVERY NOTIFICATION WITH A DOORBELL

CROSS-REFERENCE TO RELATED APPLICATION

This application claims the benefit of the following U.S. Provisional Application No. 62/319,479 filed Apr. 7, 2016, which is incorporated herein by reference in its entirety.

TECHNICAL FIELD

This invention relates generally to audio notifications.

BACKGROUND

With the increasing popularity of online shopping, the volume of home deliveries also increased. Traditionally, packages are transported by a driver who would knock on a customer's door or ring the customer's doorbell to tender the package to a customer.

BRIEF DESCRIPTION OF THE DRAWINGS

Disclosed herein are embodiments of apparatuses and methods for providing audio notification. This description includes drawings, wherein.

Figure 1:
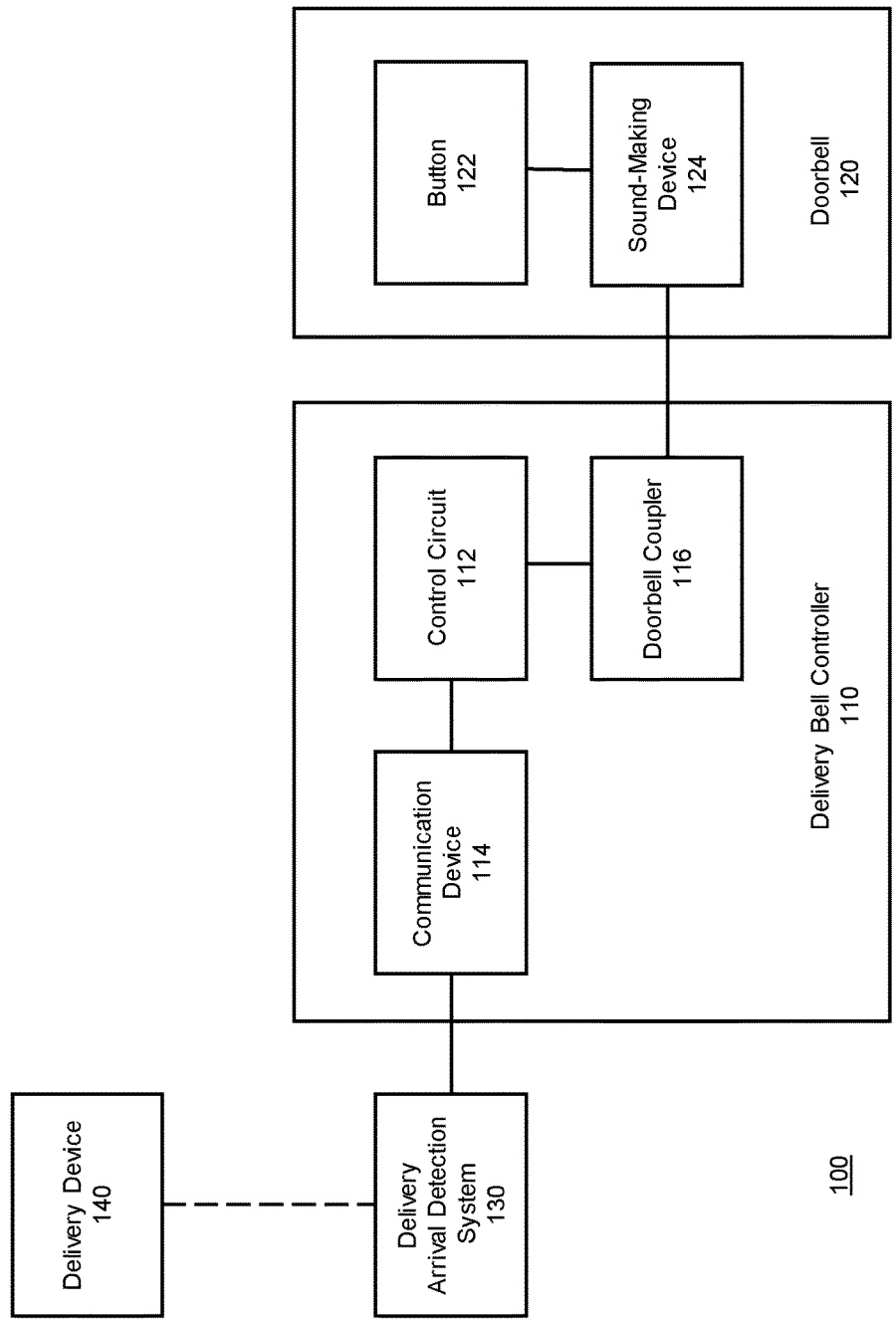
FIG. 1 is a block diagram of a system in accordance with several embodiments.

Elements in the figures are illustrated for simplicity and clarity and have not necessarily been drawn to scale. For example, the dimensions and/or relative positioning of some of the elements in the figures may be exaggerated relative to other elements to help improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful for providing audio notification. A system for providing audio notification comprises a communication device configured to communicate with a delivery arrival detection system, a doorbell coupler configured to couple to a stationary doorbell device, and a control circuit coupled to the communication device and the doorbell coupler. The control circuit being configured to receive a delivery notification from the delivery arrival detection system via the communication device and cause the stationary doorbell device to produce an audible sound via the doorbell coupler.

Conventionally, during a delivery, a delivery personnel rings a doorbell to alert a customer that their package(s) has/have arrived. A phone call or a text message may be sent to alert the customer of the delivery. However, the customer often does not notice the alert in time to receive the delivery in person.

In some embodiments, a wireless doorbell is provided herein. In some embodiments, a controller may couple to a doorbell to ring the doorbell remotely. The doorbell may be configured to produce a different sound when the doorbell is actuated wirelessly, similar to doorbells that are configured to produce different sounds when different doorbell buttons are pushed. The wireless doorbell may be remotely triggered by a person and/or an electronic device. In some embodiments, the doorbell may be triggered by a person or a vehicle crossing a geofence. In some embodiments, the doorbell may be connected to a networked hub via Wi-Fi, Bluetooth, or other wireless protocol. In some embodiments, the doorbell may be triggered locally by a Wi-Fi call and/or by an external beacon sensor.

In some embodiments, the device described herein is configured to provide doorbell notification to a customer without requiring a physical button to be pushed by a human. The device may be used for unmanned delivery by aerial and/or land vehicle. In some embodiments, the device may also provide notification for human deliveries before the delivery personnel arrives at the door. For attended delivery, the doorbell may provide an advance notice to the customer to reduce the wait time of the delivery personnel/vehicle. If the customer has a guard dog on premises, the customer may be alerted to come to the curb and accept the delivery and/or restrain the dog without the delivery personnel having to get out of the car to ring the doorbell and risk getting attacked in the process.

In some embodiments, when a delivery vehicle leaves a fulfillment center with a package on board, a central system may estimate a time of arrival for each location on the delivery route of the vehicle. In some embodiments, the estimated times may be continually updated as each delivery is completed. When the system determines that the delivery vehicle is within a predetermined amount of time from arriving at a specific location, the system may send a message to the customer associated with the delivery location (via SMS, push notification, or other mechanisms) to inform them of the estimated time of arrival. In some embodiments, the customer may be offered several choices for the delivery. For example, the customer may elect to 1) have the package taken to the door, ring the doorbell, and wait for the customer to accept the package, 2) have the package left at the door and ring the doorbell without waiting for the customer to accept the package, 3) have the package delivered to a secure locker at the customer's location, then ring the doorbell without waiting for the customer to accept the package, 4) have the package delivery rescheduled for another time, 5) have the package delivered to another location (customer's current location or to a neighbor), or 6) have the package held at another location. If one of the first three options above is selected, the system may prepare to actuate the wireless doorbell.

In some embodiments, if the package is delivered by a driver, the driver may ring the doorbell manually and/or an electronic device may ring the doorbell virtually once the vehicle arrives at the delivery location. The delivery driver may either wait for the customer to answer the door and accept and/or sign for the package, leave the package on the doorstep or another specified location, or place the package into a secure locker if available.

In some embodiments, if the package is delivered by a ground-based drone, the drone may carry the package to the doorstep and, once in proximity to the wireless doorbell, virtually ring the doorbell through a secured connection over the Internet and/or through a short-range radio frequency communication channel such as Bluetooth. In some embodiments, the drone may be configured to leave the package on the doorstep and/or transfer the package to a customer that answers the ring.

In some embodiments, if the package is delivered by an unmanned aerial vehicle (UAV), the UAV may take the package to a specified drop-off location. The UAV may virtually ring the wireless doorbell when it is hovering above the drop off the location. If delivery confirmation is required, the customer may provide the confirmation via a networked user interface (e.g. a website, a smartphone application, etc.) once the UAV has rung the virtual doorbell. In some embodiments, the wireless doorbell may play a different sound and/or the user interface may display different notifications depending on the delivery type (e.g. delivery person, UAV, etc.) and delivery progress (e.g. 1 minute away, dropped off, etc.).

Referring now to FIG. 1, a system for providing audio notification is shown. The system 100 includes delivery bell controller 110, a doorbell 120, a delivery arrival detection system 130, and a delivery device 140.

The delivery bell controller 110 comprises a control circuit 112, a doorbell coupler 116, and a communication device 114. The delivery bell controller 110 may generally be located in the same premises as the doorbell 120 may be installed in a customer's location. The delivery bell controller 110 may generally comprise any processor-based device and/or a hardwired controller. The control circuit 112 may comprise a central processing unit, a processor, a microprocessor, and the like. The control circuit 112 may be configured to execute computer readable instructions stored on the computer-readable storage memory (not shown). The computer readable storage memory may comprise volatile and/or non-volatile memory and have stored upon it a set of computer readable instructions which, when executed by the control circuit 112, causes the delivery bell controller 110 to selectively actuate the doorbell 120 via the doorbell coupler 116 based at least in part on signals received at the communication device 114.

The communication device 114 may comprise a wired and/or wireless communication device. In some embodiments, the communication device 114 may comprise a network adapter configured to couple the control circuit 112 to a network such as a home network, an Internet of Things (JOT) network, a Wi-Fi network, a mobile data network, and/or the Internet for communicating with a local or a remote delivery arrival detection system 130. In some embodiments, the communication device 114 may comprise a wired data port. Generally, the communication device 114 is configured to receive data from the delivery arrival detection system 130 and relay the data to the control circuit 112.

The doorbell coupler 116 may comprise a wired and/or wireless communication means between the delivery bell controller 110 and the doorbell 120. In some embodiments, the doorbell coupler 116 may comprise electrical connection coupled to the wiring of a doorbell 120. In some embodiments, the doorbell coupler 116 may be configured to be coupled to and/or between one or more of a sound-making device 124, a button 122, and the power source of the doorbell 120. In some embodiments, the doorbell coupler 116 may comprise a pair of wireless transmitter and receiver. The transmitter may be coupled to the delivery bell controller 110 and be configured to wirelessly send signals to a receiver coupled to the doorbell 120.

The doorbell 120 may comprise a stationary doorbell device at a delivery receiving location. The doorbell 120 may comprise a button 122 and a sound-making device 124. In some embodiments, the doorbell 120 may comprise a stationary system installed on the structure of the delivery location. For example, the wiring between the button 122 and the sound-making device 124 of the doorbell may be anchored into a wall and/or may run inside a wall of a building at the delivery location.

The button 122 may generally prefer to any mechanically actuatable switch for sounding the sound-making device 124. In some embodiments, the button 122 may comprise one or more of a push button, a switch, a toggle, a touch sensitive pad, and the like. Generally, the button 122 may be located near an entrance of a building and/or property and is configured to be actuated by a human from the outside of the entrance.

The sound-making device 124 may comprise any convention sound-making devices such as one or more of a bell, a chime, a speaker, a buzzer, and the like. In some embodiments, the sound-making device 124 may be located in the interior of a building at the delivery location. Generally, the sound-making device 124 is configured to produce a sound when the button 122 is mechanically actuated. In some embodiments, the doorbell coupler 116 may be coupled to the sound-making device 124 in parallel to the button 122. In some embodiments, the sound-making device 124 may be configured to produce different sounds depending on whether it is actuated by the button or by the delivery bell controller. For example, the sound-making device 124 may comprise two positive electrical terminals that are configured to actuate the sound-making device 124 to produce different sounds. The button 122 and the doorbell coupler may each be coupled to a positive terminal of the sound-making device 124. In some embodiments, the doorbell coupler 116 may comprise a modulator configured to modulate the power supplied to the sound-making device 124 to affect the sound produced by the sound-making device 124. In some embodiments, the delivery bell controller 110 may be configured to cause the doorbell 120 to produce a plurality of audibly distinguishable sounds. In some embodiments, the doorbell 120 may further comprise a visual indicator, such as a flashing light, for the hearing impaired.

In some embodiments, the doorbell 120 may comprise a conventional doorbell installed at a customer premises. For example, the doorbell 120 may consist of a button installed at the entrance of a building and a sound-making device 124 in the interior of the building. The doorbell coupler 116 may be configured to be retrofitted onto the conventional doorbell system. For example, the delivery bell controller 110 may be coupled to the button 122 and/or the sound-making device 124 of a conventional doorbell system. In some embodiments, the doorbell 120 and the delivery bell controller 110 may comprise an integrated device that may be actuated by the button 122 located near an entrance of a building/property and actuated remotely via the delivery arrival detection system 130.

The delivery arrival detection system 130 may generally comprise a system configured to provide a delivery notification to the delivery bell controller 110. In some embodiments, the delivery arrival detection system 130 may comprise a sensor system located at the delivery location. In some embodiments, the sensor system of the delivery arrival detection system 130 may comprise one or more of a radio frequency beacon sensor, a radio frequency identification (RFID) tag reader, a Wi-Fi transceiver, a short range radio receiver, a geofence sensor, a Global Positioning System (GPS) sensor, an infrared sensor, a motion sensor, and a range sensor. In some embodiments, the delivery arrival detection system 130 may comprise a geofence system for detecting that a device or a person has crossed a boundary. In some embodiments, the sensors of the delivery arrival detection system 130 may be positioned near a door, implemented with or near the button 122, positioned along an outdoor pathway, and/or positioned near a street entrance to the property. The delivery arrival detection system 130 may monitor for the presence and/or proximity of a delivery device 140. The delivery device 140 may comprise one or more of an autonomous motored delivery device, a semiautonomous motored delivery device, an unmanned aerial vehicle, an autonomous unmanned aerial vehicle, a delivery vehicle, and a portable user device carried by a delivery person. The delivery arrival detection system 130 may be configured to determine whether a delivery device 140 is nearby and/or on premises and send a delivery notification to the delivery bell controller 110 accordingly. In some embodiments, the delivery arrival detection system 130 may further be configured to collect identifying information from the delivery device 140 to determine one or more of the delivery device type (e.g. human, UAV, etc.), the delivery source (e.g. seller, service), and whether the delivery is expected and/or authorized. For example, the delivery arrival detection system 130 may read an RFID tag on the delivery device 140 to obtain the identifying information. The identifying information may be provided to the control circuit 112 along with the delivery notification and the control circuit 112 may determine whether to actuate the sound-making device 124 based on the identifying information. In some embodiments, the control circuit 112 may further send a notification to a user device associated with the package recipient based on the data from the delivery arrival detection system 130.

In some embodiments, the delivery arrival detection system 130 may comprise a remote central server system that manages deliveries. In some embodiments, the delivery arrival detection system 130 may comprise a computer system and/or server of a retailer and/or delivery service. The central computer system serving as the delivery arrival detection system 130 may track the location of the delivery device 140 as it travels toward the location of the delivery bell controller 110. For example, the delivery device 140 may periodically provide its GPS location to the central computer system. When the delivery device 140 is about to arrive at the delivery location, the central computer system may send a delivery notification to the delivery bell controller 110 via the communication device 114 to cause the doorbell 120 to be actuated. In some embodiments, the central computer system may further send a notification to a user device associated with the package recipient.

In some embodiments, the delivery arrival detection system 130 may comprise one or both of a local sensor system and a remote delivery management central computer system. For example, a central computer system may provide an estimated arrival time and a delivery device identifier to the control circuit 112 and/or a local delivery arrival detection system. The delivery bell controller 110 may compare the delivery device identifier received from the central computer system with a delivery device identifier detected by a local delivery arrival detection system, and only cause the doorbell 120 to produce a sound if the delivery device identifiers match.

While only one doorbell 120 is shown, in some embodiments, the delivery bell controller 110 may be coupled to a plurality of doorbells each comprising one or more buttons and/or one or more sound-making devices. For example, a large commercial building may include a plurality of doorbells for different entrances. The delivery bell controller 110 may be configured to select at least one of the sound-making devices to actuate based on a delivery location indicated in the delivery notification. In some embodiments, the delivery arrival detection system 130 may comprise a plurality of sensors near/at a plurality of entrances. The delivery bell controller 110 may select a doorbell device to actuate based on the set of systems that detects the delivery device 140. In some embodiments, a delivery notification from a delivery arrival detection system 130 comprising a remote central computer system may include detailed delivery location information (e.g. arrival GPS coordinate, entrance number, etc.) and the delivery bell controller 110 may select a doorbell to actuate based on the detailed delivery location. In some embodiments, the delivery bell controller 110 may be configured to similarly cause a single sound-making device to produce different sounds depending on which entrance is expecting delivery.

In some embodiments, the communication between one or more of the delivery device 140, the delivery arrival detection system, the delivery bell controller 110, and the doorbell 120 may be via one or more of a wired or wireless data connection, a local network, a secured network, and/or the Internet.

Figure 2:
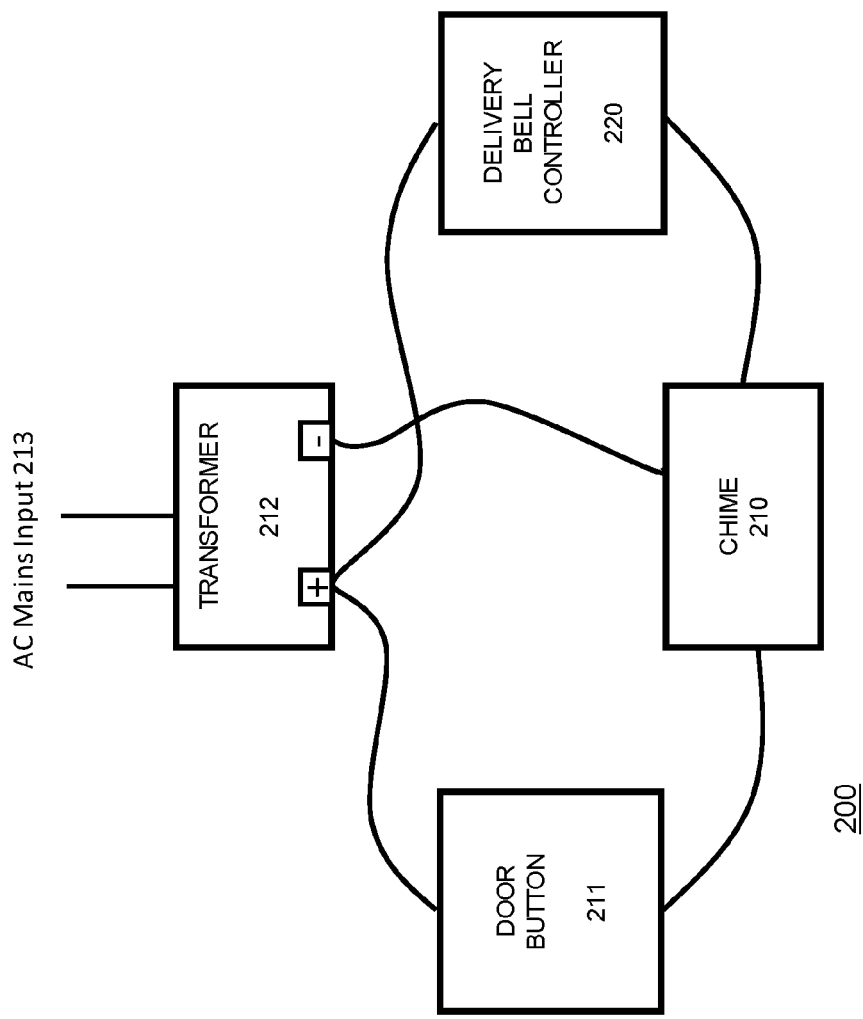
FIG. 2 is an illustration of a system in accordance with several embodiments.

Referring now to FIG. 2, an illustration of a system in accordance with several embodiments is shown. The system 200 comprises a chime 210, a door button 211, a transformer 212, and a delivery bell controller 220. The system 200 may generally comprise a system located at a delivery destination location.

The transformer 212 may be coupled between the AC mains input 213 and one or more other components of the system 200 to supply power to the system 200. The AC mains input 213 may comprise the electric grid of the delivery location. In some embodiments, the transformer 212 may be additionally or alternatively coupled to a battery device and/or a solar power cell.

The door button 211 may generally comprise any actuator for causing the chime 210 to produce a sound. In some embodiments, the door button may comprise the button 122 described with reference to FIG. 1 herein. In FIG. 2, the door button 211 is coupled between the transformer 212 and the chime 210 such that pressing of the door button 211 causes electricity to be supplied to the chime 210 to produce a sound. The chime 210 may generally be referred to as a sound-making device. In some embodiments, the chime 210 may comprise the sound-making device 124 described with reference to FIG. 1 herein.

The delivery bell controller 220 may be configured to cause the chime 210 to produce a sound to indicate the arrival of a delivery. In some embodiments, the delivery bell controller 220 may comprise the delivery bell controller 110 described with reference to FIG. 1 herein. In some embodiments, the wiring between delivery bell controller 220 and the transformer 212 as well as the chime 210 may comprise the doorbell coupler 116 described with reference to FIG. 1. In some embodiments, the delivery bell controller 220 may cause the chime 210 to produce a sound based on a delivery notification received from a delivery arrival detection system. In some embodiments, the delivery arrival detection system may comprise one or more sensors at the delivery location that detect the presence and/or proximity of a deliverer and/or a remote central computer system that manages and/or tracks deliveries.

In FIG. 2, the delivery bell controller 220 is coupled between the transformer 212 and the chime 210. The delivery bell controller 220 may be configured to selectively supply power to the chime 210 to cause the chime 210 to produce a sound. In some embodiments, the chime 210 may comprise at least two positive terminals and the delivery bell controller 220 and the door button 211 may be coupled to a different positive terminal of the chime 210 to produce different sounds. In some embodiments, the delivery bell controller 220 may be configured to supply a different voltage or current to the chime 210 to produce a sound that is distinguishable from the sound produced by pressing the door button 211. In some embodiments, the delivery bell controller 220 may comprise a modulator for modulating the power supplied to the chime 210 to produce sounds that may vary in one or more of tone, pitch, volume, and duration. In some embodiments, the delivery bell controller 220 may be configured to cause the chime 210 to produce two or more sounds depending on one or more of the location of delivery (e.g. front door vs. back door), type of deliverer expected (e.g. human, UAV, etc.), delivery service (e.g. company A, company B), and the intended recipient (e.g. person A, department A, apartment A, etc.). In some embodiments, the delivery bell controller 220 may also be powered by the AC mains input 213 and/or the transformer 212. In some embodiments, the delivery bell controller 220 may be separately coupled to the AC mains of the delivery location and/or a battery.

In some embodiments, the system 200 comprises one or more additional physical buttons similar to the door button 211 that are located at other entrances of the delivery location. In some embodiments, each button may be configured to cause the chime 210 to produce a different sound. In some embodiments, instead being coupled between the transformer 212 and the chime 210, the delivery bell controller 220 may be implemented with and/or coupled to the door button 211. For example, the delivery bell controller 220 may be coupled in parallel to the door button 211 and share at least one of the physical wiring running to the transformer 212 and/or the chime 210. In another example, when the door button 211 is pressed, the signal may be routed through the delivery bell controller 220 prior to being sent to the chime 210. In some embodiments, the delivery bell controller 220 may be retrofitted onto a convention doorbell system by mounting the delivery bell controller behind the door button 211 or adding the delivery bell controller 220 to a housing containing the chime 210. In some embodiments, the delivery bell controller 220 may be retrofitted onto a convention doorbell system by replacing the original door button with a new button comprising an integrated delivery bell controller 220 and door button 211. In some embodiments, the integrated delivery bell controller and button may further include sensors of a local delivery arrival detection system described herein.

Figure 3:
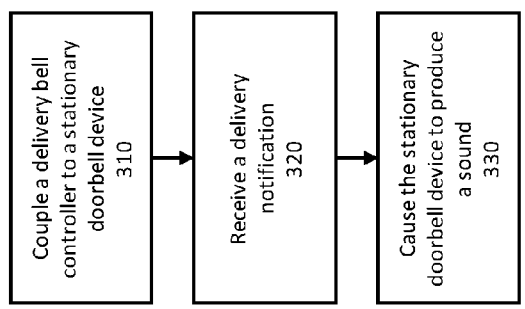
FIG. 3 is a flow diagram of a method in accordance with several embodiments.

Referring now to FIG. 3, a method for providing audio notification is shown. Generally, the method shown in FIG. 3 may be implemented with one or more processor-based devices such as devices having a control circuit, a central processor, a microprocessor, and the like. In some embodiments, one or more steps in the method shown in FIG. 3 may be implemented with the control circuit 112 of the delivery bell controller 110 and/or the delivery arrival detection system 130 shown in FIG. 1 or a similar device.

In step 310, a delivery bell controller is coupled to a stationary doorbell device. In some embodiments, the delivery bell controller comprises a communication device, a doorbell coupler, and a control circuit. In some embodiments, the stationary doorbell device may comprise a stationary device installed at a delivery receiving location. The stationary doorbell device may comprise a button and a sound-making device. In some embodiments, the wiring between the button and the sound-making device of the doorbell may be anchored into a wall and/or may run inside a wall of a building at the delivery location. In some embodiments, the delivery bell controller may be coupled to the stationary doorbell device electronically such that the delivery bell controller is configured to cause the sound-making device of the stationary doorbell device to produce a sound. In some embodiments, coupling the delivery bell controller and the doorbell comprises causing electricity to run between the delivery bell controller and the doorbell. In some embodiments, the delivery bell controller is coupled to the stationary doorbell via a doorbell coupler. In some embodiments, step 310 may comprise coupling the delivery bell controller 110 to the doorbell 120 described with reference to FIG. 1 herein. In some embodiments, the doorbell coupler may comprise wiring between one or more components of the stationary doorbell device and the delivery bell controller. For example, the doorbell coupler may be coupled between two or more of a power source, a button, and a sound-making device of the stationary doorbell device. In some embodiments, step 310 may comprise retrofitting a delivery bell controller onto a convention doorbell system.

In step 320, a delivery notification is received at the control circuit of the delivery bell controller. In some embodiments, the delivery notification is generated by a delivery arrival detection system. In some embodiments, the delivery arrival detection system may comprise a sensor system located at the delivery location. In some embodiments, the delivery arrival detection system may comprise one or more of a radio frequency beacon sensor, a radio frequency identification (RFID) tag reader, a Wi-Fi transceiver, a short range radio receiver, a geofence sensor, a Global Positioning System (GPS) sensor, an infrared sensor, a motion sensor, and a range sensor. In some embodiments, the delivery arrival detection system may comprise a geofence system for detecting that a device or a person has crossed a boundary. The delivery arrival detection system may monitor for the presence and/or proximity of a delivery device. The delivery device may comprise one or more of an autonomous motored delivery device, a semiautonomous motored delivery device, an unmanned aerial vehicle, an autonomous unmanned aerial vehicle, a delivery vehicle, and a portable user device carried by a delivery person. The delivery arrival detection system may be configured to determine whether a delivery device is nearby and/or on premises and send a delivery notification to the delivery bell controller based on the presence and/or proximity of the delivery device. In some embodiments, the delivery arrival detection system may further be configured to collect identifying information from the delivery device to determine one or more of the delivery device type (e.g. human, UAV, etc.), the delivery source (e.g. seller, service), and whether the delivery is expected and/or authorized. The identifying information may be provided to the control circuit along with the delivery notification and the control circuit may determine whether to actuate the sound-making device based at least in part on the identifying information.

In some embodiments, the delivery arrival detection system may comprise a remote computer system that manages and/or tracks deliveries to multiple locations. In some embodiments, the delivery arrival detection system may comprise a computer system and/or server of a retailer and/or delivery service. The central computer system may track the location of the delivery device as it travels toward the location of the delivery bell controller. For example, the delivery device may periodically provide its GPS location to the central computer system. When the delivery device is about to arrive at the delivery location, the central computer system may send a delivery notification to the delivery bell controller via the communicate device to cause the doorbell to be actuated. In some embodiments, the central computer system may set a trigger distance (e.g. 1 mile) and/or travel time (e.g. 1 minute) between the delivery device and the destination location at which the delivery notification is sent.

In some embodiments, the delivery arrival detection system may comprise one or both of a local sensor and a remote central computer system. For example, a central computer system may provide an estimated arrival time and a delivery device identifier to the control circuit and/or a local delivery arrival detection system. The delivery bell controller may compare the delivery device identifier received from a server with a delivery device identifier detected by a local delivery arrival detection system and only cause the doorbell to produce a sound if the delivery device identifiers match. In another example, the central computer system may provide an estimated time of arrival to the delivery bell controller. The delivery bell controller may then wake the local sensors around the estimated time of arrival to detect the actual arrival of the delivery device.

In step 330, the control circuit of the delivery bell controller 110 causes the doorbell device to produce an audible sound. In some embodiments, the delivery bell controller may be configured to supply power to a sound-making device of a stationary doorbell device to produce an audio notification. In some embodiments, the delivery bell controller may be configured to supply a different voltage or current to the sound-making device to produce a sound that is distinguishable from the sound produced by pressing a button of the doorbell device. In some embodiments, the delivery bell controller may comprise a modulator for modulating the power supplied to the sound-making device of the doorbell to produce sounds that may vary in one or more of tone, pitch, volume, and duration. In some embodiments, the delivery bell controller may be configured to cause the sound-making device to produce two or more sounds depending on one or more of the location of delivery (e.g. front door vs. back door), type of deliverer expected (e.g. human, UAV, etc.), delivery service (e.g. company A, company B), and the intended recipient (e.g. person A, department A, apartment A, etc.). The location of delivery, type of delivery expected, delivery service, and intended recipient information may be received from a delivery arrival detection system with the delivery notification at step 320. In some embodiments, the delivery bell controller may be coupled to two or more sound-making devices of two or more doorbells for different entrances. The delivery bell controller may be configured to select one the sound-making devices based on the entrance expected to be used for delivery. In some embodiments, the entrance expected to be used for delivery may be determined based on the delivery notification received in step 320 and/or location information of the delivery device.

Figure 4:
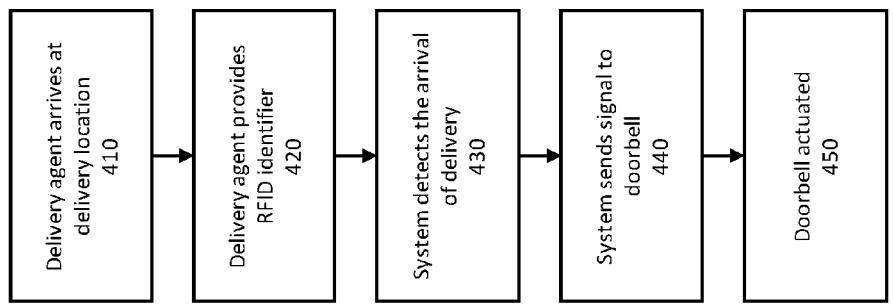
FIG. 4 is a flow diagram of a process in accordance with several embodiments.

Referring now to FIG. 4, a method for providing audio notification is shown. Generally, the method shown in FIG. 4 may be implemented with one or more processor-based devices such as devices having a control circuit, a central processor, a microprocessor, and the like. In some embodiments, one or more steps in the method shown in FIG. 4 may be implemented and/or tracked with one or more of the control circuit 112 of the delivery bell controller 110, the delivery arrival detection system 130, and/or the delivery device 140 shown in FIG. 1 or a similar device.

In step 410, a delivery agent arrives at a delivery location. The delivery agent may comprise one or more of an autonomous motored delivery device, a semiautonomous motored delivery device, an unmanned aerial vehicle, an autonomous unmanned aerial vehicle, a delivery vehicle, and a delivery person. The arrival of the delivery agent may correspond to the delivery agent being a set distance (e.g. 0.5 miles) and/or travel time (e.g. 1 minute) away from the delivery location.

In step 420, the delivery agent provides an RFID identifier to an arrival detection system. In some embodiments, the delivery agent may include an active or passive RFID tag that is read by an arrival detection system at the delivery location. In step 430, the system detects the arrival of delivery. In some embodiments, the arrival detection system may use the RFID identifier information received in step 420 to determine whether the RFID identifier is associated with a delivery agent to detect the delivery. In some embodiments, a delivery management server may provide the RFID identifier of the delivery agent to the arrival detection system such that the system may verify that the delivery agent is expected and/or authorized.

In step 440, the system sends a signal to the doorbell. In some embodiments, the signal may cause power to be supplied to a sound-making device of the doorbell. In some embodiments, the signal may be similar to the signal produced when a button of the doorbell is pressed. In some embodiments, the sound-making device of the doorbell may be configured to produce a different sound depending on whether it is actuated via the arrival detection system or by the pressing of a physical button. In step 450, the doorbell is actuated to produce an audible sound. The sound then functions to notify the recipient of the arrival of the delivery agent without the delivery agent having to physical press the doorbell button.

Figure 5:
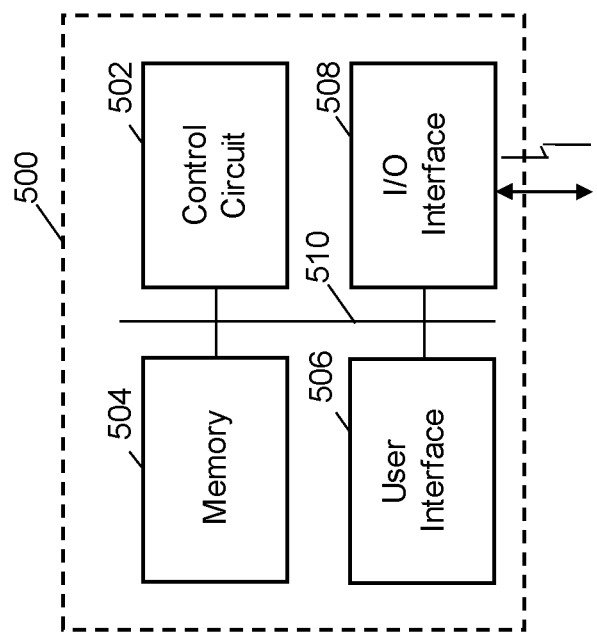
FIG. 5 is a block diagram of a computer device in accordance with several embodiments.

FIG. 5 illustrates a functional block diagram that may generally represent any number of various electronic components of the system for providing the delivery notification that is a computer type device. The computer device 500 includes a control circuit 502, a memory 504, a user interface 506 and an input/output (I/O) interface 508 providing any type of wired and/or wireless connectivity to the computer device 500, all coupled to a communication bus 510 to allow data and signaling to pass therebetween. Generally, the control circuit 502 and the memory 504 may be referred to as a control unit. The control circuit 502, the memory 504, the user interface 506 and the I/O interface 508 may be any of the devices described herein or as understood in the art. The functionality of the computer device 500 will depend on the programming stored in the memory 504. The computer device 500 may represent a high level diagram for one or more of a delivery device, a remote delivery detection system, a local delivery detection system, a delivery bell controller, and a user device configured to communicate with the delivery bell controller and/or the remote delivery detection system.

Figure 6:
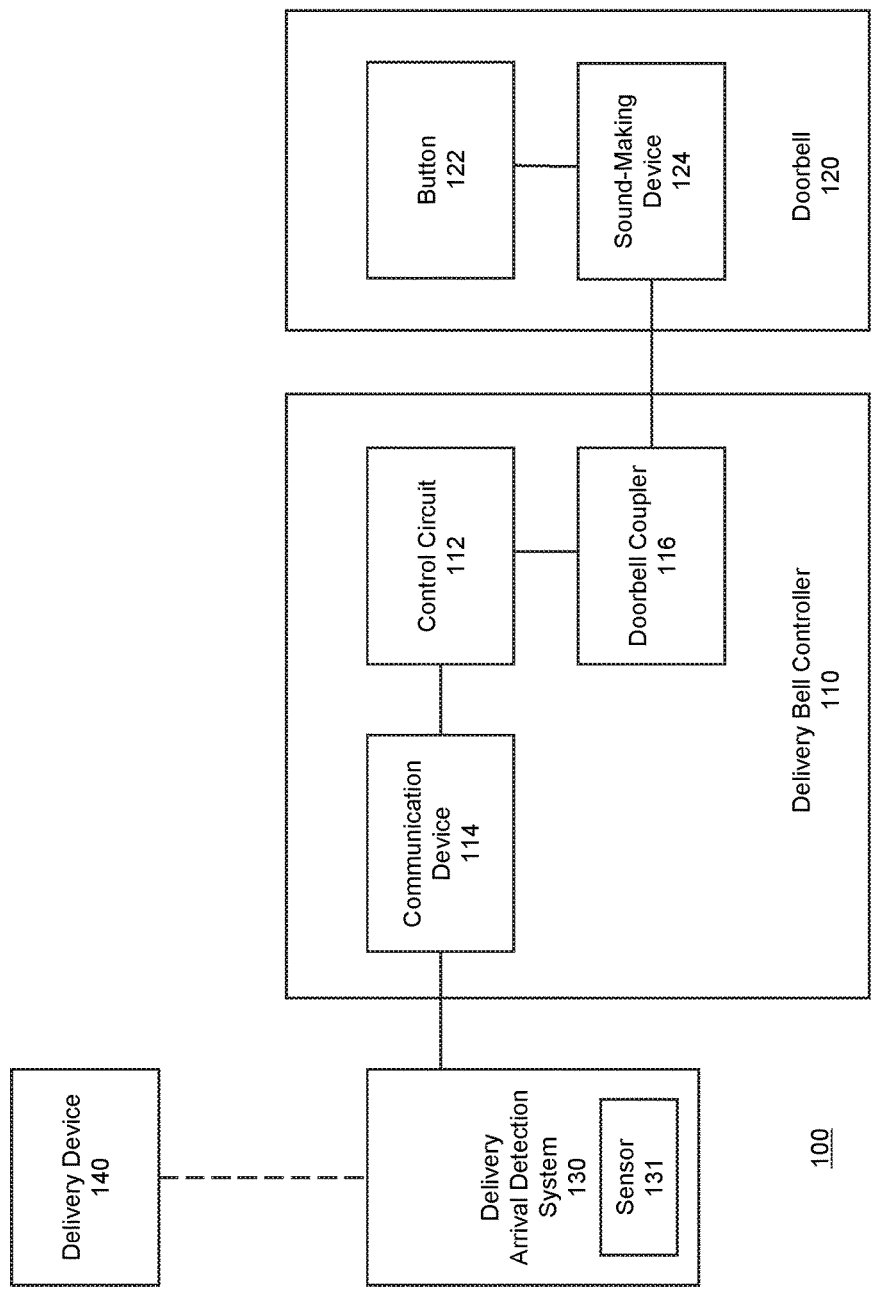
FIG. 6 is a block diagram of a system in accordance with several embodiments.

Referring now to FIG. 6, a system for providing audio notification is shown. FIG. 6 is generally the same as FIG. 1 except for the addition of the sensor 131 to show an embodiment in which the delivery arrival detection system 130 comprises a sensor 131 configured to detect a proximity of a delivery device 140.

Figure 7:
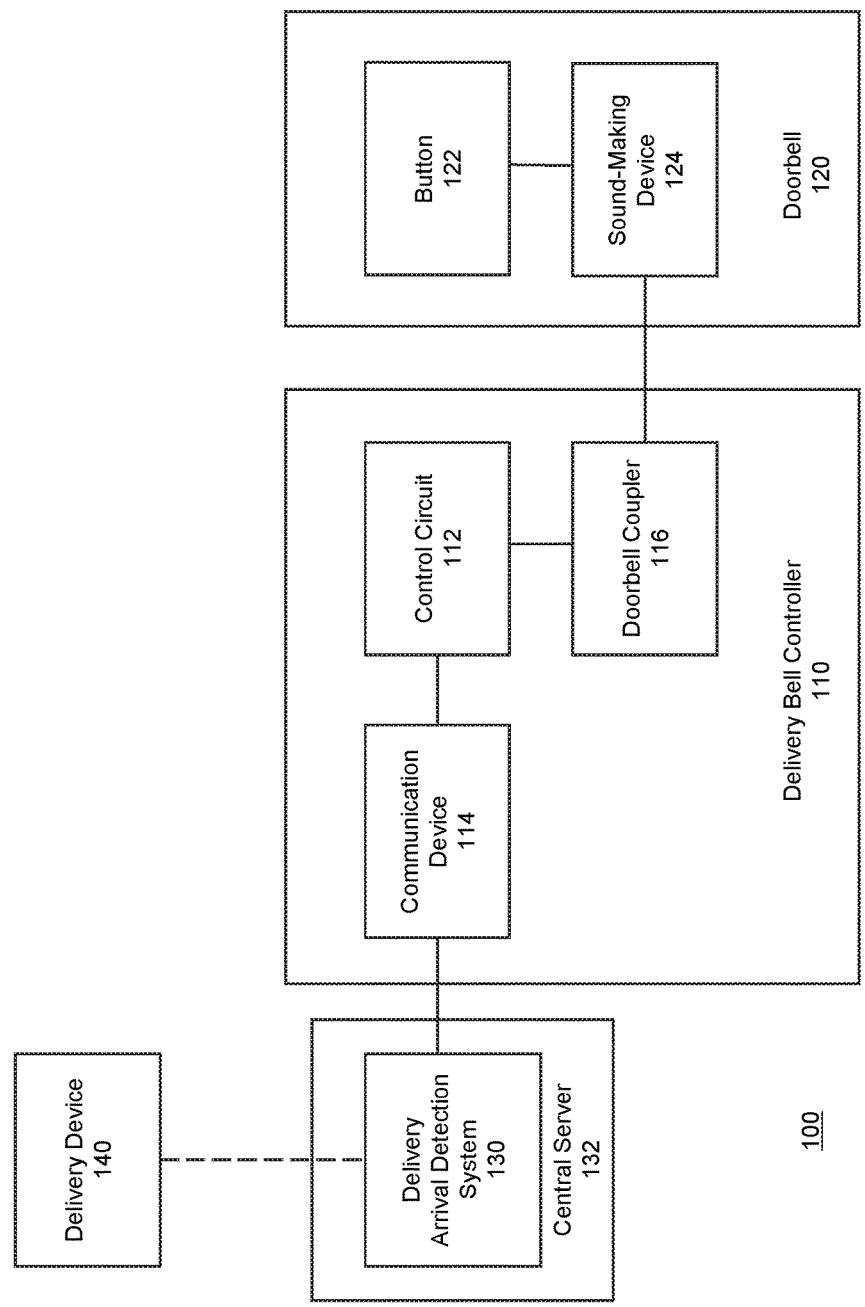
FIG. 7 is a block diagram of a system in accordance with several embodiments.

Referring now to FIG. 7, a system for providing audio notification is shown. FIG. 7 is generally the same as FIG. 1 except for the addition of the central server 132 to show an embodiment in which the delivery arrival detection system 130 comprises a central server 132 communicating with a delivery device 140.

Figure 8:
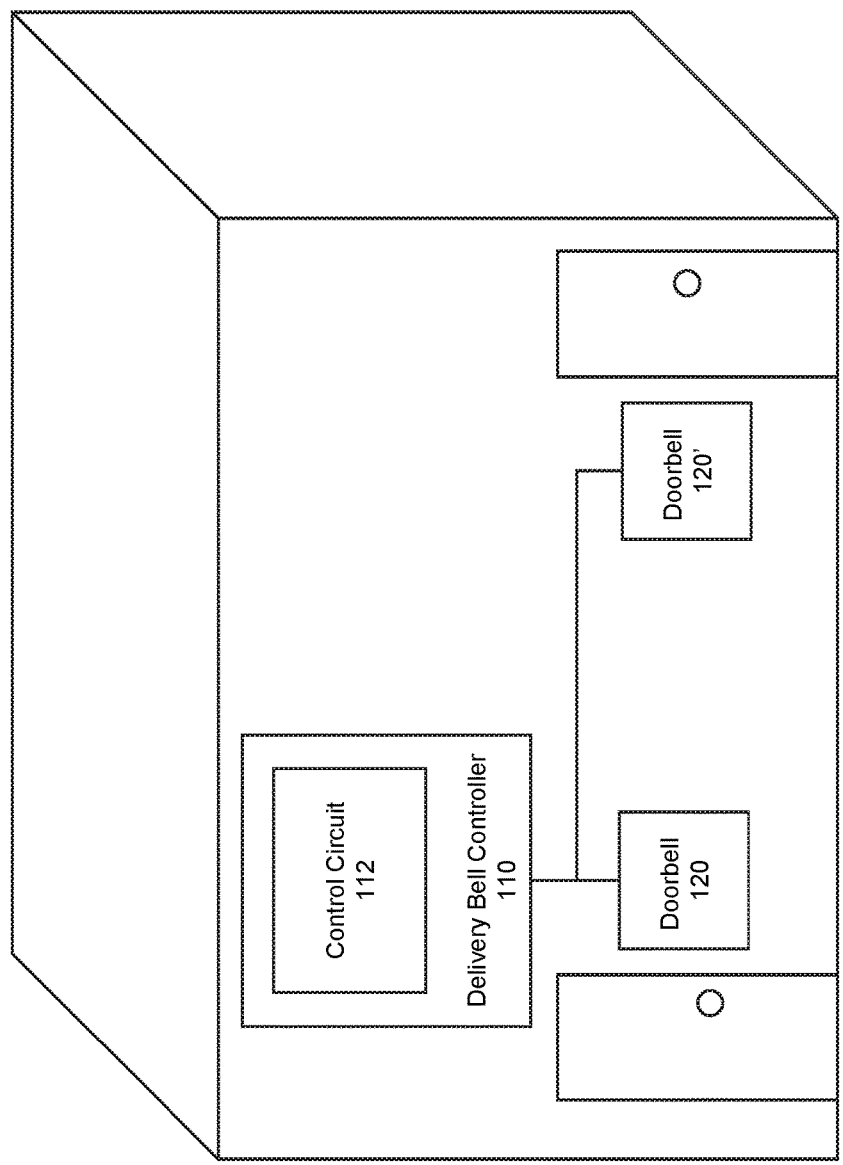
FIG. 8 is an illustration of a system in accordance with several embodiments.

Referring now to FIG. 8, an illustration of a building is shown. FIG. 8 shows an embodiment in which the delivery bell controller 110 is coupled to a plurality of stationary doorbell devices each associated with a different entrance of a building. The delivery bell controller 110 is coupled to a first doorbell 120 at a first entrance of the building and a second doorbell 120' at a second entrance of the building.

In one embodiment, a system for providing audio notification comprises a communication device configured to communicate with a delivery arrival detection system, a doorbell coupler configured to couple to a stationary doorbell device, and a control circuit coupled to the communication device and the doorbell coupler. The control circuit being configured to receive a delivery notification from the delivery arrival detection system via the communication device and cause the stationary doorbell device to produce an audible sound via the doorbell coupler.

In one embodiment, a method for providing audio notification comprises coupling a delivery bell controller to a stationary doorbell device, the delivery bell controller comprises a communication device configured to communicate with a delivery arrival detection system, a doorbell coupler configured to couple to the stationary doorbell device, and a control circuit; receiving, at the control circuit, a delivery notification from the delivery arrival detection system via the communication device; and causing, with the control circuit, the stationary doorbell device to produce an audible sound via the doorbell coupler.

In one embodiment, a system for providing audio notification comprises a doorbell device comprising a button located at an entrance of a building, a sound-making device, and a power source, and a delivery bell controller coupled to the doorbell device comprising a communication device configured to communicate with a delivery arrival detection system, and a control circuit coupled to the communication device and configured to receive a delivery notification from the delivery arrival detection system via the communication device and cause the power source to supply power to the sound-making device of the doorbell device.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for providing audio notification comprising:
    a communication device configured to communicate with a delivery arrival detection system;
    a doorbell coupler configured to couple to a stationary doorbell device; and
    a control circuit coupled to the communication device and the doorbell coupler, the control circuit being configured to:
        receive a delivery notification from the delivery arrival detection system via the communication device; and
        cause the stationary doorbell device to produce an audible sound via the doorbell coupler.

2. The system of claim 1, wherein the delivery arrival detection system comprises a central server communicating with a delivery device comprising one or more of: an autonomous motored delivery device, a semiautonomous motored delivery device, an unmanned aerial vehicle, an autonomous unmanned aerial vehicle, a delivery vehicle, and a portable user device carried by a delivery person.

3. The system of claim 2, wherein the central server sends the delivery notification to the control circuit based on tracking a location of the delivery device.

4. The system of claim 1, wherein the delivery arrival detection system comprises a sensor configured to detect a proximity of a delivery device comprising one or more of an autonomous motored delivery device, a semiautonomous motored delivery device, an unmanned aerial vehicle, an autonomous unmanned aerial vehicle, a delivery vehicle, and a portable user device carried by a delivery person.

5. The system of claim 4, wherein the sensor comprises one or more of a radio frequency beacon sensor, a radio frequency identification (RFID) tag reader, a Wi-Fi transceiver, a short range radio receiver, a geofence sensor, a Global Positioning System (GPS) sensor, an infrared sensor, a motion sensor, and a range sensor.

6. The system of claim 1, wherein the stationary doorbell device comprises a sound-making device and a button located at an entrance of a building.

7. The system of claim 6, wherein the control circuit is configured to cause the sound-making device to produce the audible sound such that the audible sound is audibly distinguishable from a sound produced by the sound-making device when the button is actuated.

8. The system of claim 1, wherein the doorbell coupler is wired to a power source of the stationary doorbell device and a sound-making device of the stationary doorbell device.

9. The system of claim 1, wherein the control circuit is coupled to a plurality of stationary doorbell devices each associated with a difference entrance of a building, and the control circuit is configured to select at least one of the plurality of stationary doorbell devices to actuate based on a delivery location indicated in the delivery notification.

10. The system of claim 1, wherein the control circuit is configured to cause the stationary doorbell device to produce a plurality of audibly distinguishable sounds.

11. A method for providing audio notification comprising:
    coupling a delivery bell controller to a stationary doorbell device, the delivery bell controller comprises:
        a communication device configured to communicate with a delivery arrival detection system;
        a doorbell coupler configured to couple to the stationary doorbell device; and
        a control circuit;
    receiving, at the control circuit, a delivery notification from the delivery arrival detection system via the communication device; and
    causing, with the control circuit, the stationary doorbell device to produce an audible sound via the doorbell coupler.

12. The method of claim 11, wherein the delivery arrival detection system comprises a central server communicating with a delivery device comprising one or more of an autonomous motored delivery device, a semiautonomous motored delivery device, an unmanned aerial vehicle, an autonomous unmanned aerial vehicle, a delivery vehicle, and a portable user device carried by a delivery person.

13. The method of claim 12, wherein the central server sends the delivery notification to the control circuit based on tracking a location of the delivery device.

14. The method of claim 11, wherein the delivery arrival detection system comprises a sensor configured to detect a proximity of a delivery device comprising one or more of an autonomous motored delivery device, a semiautonomous motored delivery device, an unmanned aerial vehicle, an autonomous unmanned aerial vehicle, a delivery vehicle, and a portable user device carried by a delivery person.

15. The method of claim 14, wherein the sensor comprises one or more of a radio frequency beacon sensor, a radio frequency identification (RFID) tag reader, a Wi-Fi transceiver, a short range radio receiver, a geofence sensor, a Global Positioning System (GPS) sensor, an infrared sensor, a motion sensor, and a range sensor.

16. The method of claim 11, wherein the stationary doorbell device comprises a sound-making device and a button located at an entrance of a building.

17. The method of claim 16, wherein the control circuit is configured to cause the sound-making device to produce the audible sound such that the audible sound is audibly distinguishable from a sound produced by the sound-making device when the button is actuated.

18. The method of claim 11, wherein the doorbell coupler is wired to a power source of the stationary doorbell device and a sound-making device of the stationary doorbell device.

19. The method of claim 11, wherein the control circuit is coupled to a plurality of stationary doorbell devices each associated with a difference entrance of a building, and the control circuit is configured to select at least one of the plurality of stationary doorbell devices to actuate based on a delivery location indicated in the delivery notification.

20. The method of claim 11, wherein the control circuit is configured to cause the stationary doorbell device to produce a plurality of audibly distinguishable sounds.

21. A system for providing audio notification comprising:
   a doorbell device comprising:
      a button located at an entrance of a building;
      a sound-making device; and
      a power source; and
   a delivery bell controller coupled to the doorbell device comprising:
      a communication device configured to communicate with a delivery arrival detection system; and
      a control circuit coupled to the communication device and configured to:
         receive a delivery notification from the delivery arrival detection system via the communication device; and
         cause the power source to supply power to the sound-making device of the doorbell device.

* * * * *